US012792792B2

(12) United States Patent
Yang et al.

(10) Patent No.: US 12,792,792 B2
(45) Date of Patent: Nov. 10, 2026

(54) ARTIFICIAL-INTELLIGENCE-ASSISTED METHOD FOR PROVIDING URBAN DESIGN FORM AND LAYOUT WITH IMPROVED WIND ENVIRONMENT

(71) Applicant: SOUTHEAST UNIVERSITY, Nanjing (CN)

(72) Inventors: Junyan Yang, Nanjing (CN); Dian Shao, Nanjing (CN); Beixiang Shi, Nanjing (CN); Xiao Zhu, Nanjing (CN); Jie Gu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 1399 days.

(21) Appl. No.: 17/611,004

(22) PCT Filed: Oct. 28, 2020

(86) PCT No.: PCT/CN2020/124322
§ 371 (c)(1),
(2) Date: Nov. 12, 2021

(87) PCT Pub. No.: WO2022/047959
PCT Pub. Date: Mar. 10, 2022

(65) Prior Publication Data

US 2022/0309201 A1 Sep. 29, 2022

(30) Foreign Application Priority Data

Sep. 4, 2020 (CN) ........................ 202010923497.X

(51) Int. Cl.
*G06F 30/13* (2020.01)
*G06F 30/27* (2020.01)
(Continued)

(52) U.S. Cl.
CPC .............. *G06F 30/13* (2020.01); *G06F 30/27* (2020.01); *G06F 30/28* (2020.01); *G06F 2111/10* (2020.01)

(58) Field of Classification Search
None
See application file for complete search history.

(56) References Cited

U.S. PATENT DOCUMENTS

2018/0246138 A1* 8/2018 Holtom ................. G01S 13/956
2019/0101934 A1* 4/2019 Tuukkanen ............ G01C 21/20
(Continued)

FOREIGN PATENT DOCUMENTS

CN 103136432 A 6/2013
CN 105513133 A 4/2016
(Continued)

OTHER PUBLICATIONS

X. Fang, H. Xu and G. Chen, "Optimization of Residential Buildings Layout With Wind Environment Constraints," 2020 International Conference on Virtual Reality and Intelligent Systems (ICVRIS), Zhangjiajie, China, 2020, pp. 1067-1071, doi: 10.1109/ICVRIS51417.2020.00260. (Year: 2020).*
(Continued)

*Primary Examiner* — Ryan F Pitaro
(74) *Attorney, Agent, or Firm* — MUNCY, GEISSLER, OLDS & LOWE, P.C.

(57) ABSTRACT

The present invention discloses an artificial-intelligence (AI)-assisted method for providing an urban design form and layout with an improved wind environment. The method includes data acquisition, construction of a wind field interactive sand table, wind field simulation and evaluation of an urban design plan, AI-assisted adjustment of an urban design form and layout, determination of conformity to urban design standard specifications, wind field simulation and
(Continued)

evaluation of an adjusted plan, and holographic display of the plan with an improved wind environment. The present invention can achieve the improvement of the wind environment in the field of urban planning design, and adjust the urban form and layout by performing random dotting on a building based on the random algorithm. Therefore, the wind environment in the urban design is improved more efficiently by means of accurate quantification, and the quality of the urban design plan is more desirable.

5 Claims, 4 Drawing Sheets

(51) Int. Cl.

| | |
|---|---|
| *G06F 30/28* | (2020.01) |
| *G06F 111/10* | (2020.01) |

(56) References Cited

U.S. PATENT DOCUMENTS

| | | | | |
|---|---|---|---|---|
| 2020/0018666 | A1 * | 1/2020 | Tang | G06F 30/28 |
| 2022/0067231 | A1 * | 3/2022 | Kang | G06F 30/27 |

FOREIGN PATENT DOCUMENTS

| | | | | |
|---|---|---|---|---|
| CN | 105913135 | A | * | 8/2016 |
| CN | 106156516 | A | | 11/2016 |
| CN | 109948214 | A | | 6/2019 |
| CN | 110110353 | A | | 8/2019 |
| CN | 110175374 | A | | 8/2019 |
| JP | 2000259700 | A | | 9/2000 |
| KR | 20170033711 | A | | 3/2013 |

OTHER PUBLICATIONS

Yang, An-Shik, et al. "Using the central ventilation shaft design within public buildings for natural aeration enhancement." Applied thermal engineering 70.1 (2014): 219-230. (Year: 2014).*

Kaseb, Zeynab, et al. "A framework for pedestrian-level wind conditions improvement in urban areas: CFD simulation and optimization." Building and Environment 184 (2020): 107191. (Year: 2020).*

Guo, Weihong, Xiao Liu, and Xu Yuan. "A case study on optimization of building design based on CFD simulation technology of wind environment." Procedia Engineering 121 (2015): 225-231 (Year: 2015).*

Lee, Su-Mi, and Doosam Song. "Evaluation of wind environment around the building in the early design stages using BIM-based CFD simulation." International Journal of Air-Conditioning and Refrigeration 19.04 (2011): 263-272. (Year: 2011).*

Yang, A-S., et al. "Investigation on wind environments of surrounding open spaces around a public building." Journal of Mechanics 33.1 (2017): 101-113. (Year: 2017).*

Hoang, Thi Kim Dung, and Phu Khanh Nguyen. "A Numerical Analysis of Wind Flow in Urban Areas." IPTEK Journal of Proceedings Series 3.6 (2017). (Year: 2017).*

Sousa, Joana Pack Melo, et al. "Empirical analysis of three wind simulation tools to support urban planning in early stages of design." Blucher Des. Proc 2 (2015): 363-370. (Year: 2015).*

Piepereit, R., et al. "A sweep-plane algorithm for the simplification of 3D building models in the application scenario of wind simulations." The International Archives of the Photogrammetry, Remote Sensing and Spatial Information Sciences 42 (2018): 151-156. (Year: 2018).*

Dhunny, A. Z., et al. "Investigation of multi-level wind flow characteristics and pedestrian comfort in a tropical city." Urban Climate 24 (2018): 185-204. (Year: 2018).*

Zhou, Hong, et al. "Harvesting wind energy in low-rise residential buildings: Design and optimization of building forms." Journal of Cleaner Production 167 (2017): 306-316. (Year: 2017).*

* cited by examiner

| Wind velocity (m/s) | Wind velocity (km/h) | Land conditions | Sea conditions | Wave height (m) | Maximum wave (m) |
|---|---|---|---|---|---|
| 0~0. 2 | <1 | Calm, smoke rises vertically. | Flat. | 0 | 0 |
| 0. 3~1. 5 | 1~5 | Smoke drift indicates wind directions. | Ripples without crests. | 0. 1 | 0. 1 |
| 1. 6~3. 3 | 6~11 | Wind felt on exposed skin. | Small wavelets. Crests of glassy appearance, not breaking. | 0. 2 | 0. 3 |
| 3. 5~5. 4 | 12~19 | Flags extended. | Small wavelets. Crests begin to break. | 0. 6 | 1. 0 |
| 5. 5~7. 9 | 20~28 | Dust raised. | Small waves with breaking crests. Fairly frequent whitecaps. | 1. 0 | 1. 5 |
| 8. 0~10. 7 | 29~38 | Small trees in leaf begin to sway. | Moderate waves of some length. Many white horses. Small amount of spray. | 2. 0 | 2. 5 |
| 10. 8~13. 8 | 39~49 | Whistling heard in overhead wires. | Long waves begin to form. White foam crests are very frequent. Some airborne spray is present. | 3. 0 | 4. 0 |
| 13. 9~17. 1 | 50~61 | Effort needed to walk against the wind | Sea heaps up. Some foam from breaking waves is blown into streaks along wind direction. Moderate amounts of airborne spray. | 4. 0 | 5. 5 |
| 17. 2~20. 7 | 62~74 | Some twigs broken from trees | Moderately high waves with breaking crests forming spindrift. Well-marked streaks of foam are blown along wind direction. Considerable airborne spray. | 5. 5 | 7. 5 |
| 20. 8~24. 4 | 75~88 | Slight damage to houses | High waves whose crests sometimes roll over | 7. 0 | 10. 0 |
| 24. 5~28. 4 | 89~102 | Trees are uprooted | Very high waves with overhanging crests. | 9. 0 | 12. 5 |
| 28. 5~32. 6 | 103~117 | Considerable damage. | Exceptionally high waves. Very large patches of foam, driven before the wind, cover much of sea surface. | 11. 5 | 16 |
| >32. 6 | >117 | Very widespread damage | Huge waves. Sea completely white with foam and spray. | 14 | —— |

FIG. 2

ARTIFICIAL-INTELLIGENCE-ASSISTED METHOD FOR PROVIDING URBAN DESIGN FORM AND LAYOUT WITH IMPROVED WIND ENVIRONMENT

TECHNICAL FIELD

The present invention relates to the field of urban planning, and specifically, to an artificial-intelligence (AI)-assisted method for providing an urban design form and layout with an improved wind environment.

BACKGROUND

A wind environment is one of important research contents of an urban planning subject, which is a wind field formed by outdoor natural wind under the impact of urban landforms or natural landforms. Desirable quality of an urban wind environment can improve indoor and outdoor comfort of urban residents, reduce energy consumption required by urban buildings for warming in winter and cooling in summer, and can gradually release atmospheric pollution caused by automobile exhaust near an underlying surface of a city timely. A traditional urban form design does not take the wind environment into account. Therefore, neither whether a wind velocity standard requirement is satisfied can be detected during layout, nor a local layout and form can be adjusted in combination with the wind velocity standard requirement. AI provides a more scientific and efficient urban design means. A wind field interactive sand table is constructed to simulate a wind environment, so as to intelligently adjust an urban form and layout, thereby effectively improving the wind environment.

Current common methods for improving the urban wind environment includes the following. In a first method, in order to improve the wind environment between buildings, modeling is performed in computational fluid dynamics (CFD) software, and a wind environment is simulated. A simulation result is compared with the Evaluation Standard for Green Building. A plane layout is preferably selected. However, since the method does not take impact of surrounding buildings on plot wind environment into account, a simulation error is very large, and the method is applicable to improvement of the wind environment between two buildings, failing to improve the wind environment of an entire block. In another method, a wind tunnel test is performed to perform simulation and adjustment. However, the method costs massive manpower and material resources, has large adjustment difficulty, a large error coefficient, and large judgment randomness, lacks process efficiency, and lacks result scientificity.

SUMMARY

In order to resolve the above disadvantages in the background, the present invention is intended to provide an AI-assisted method for providing an urban design form and layout with an improved wind environment. By means of the present invention, an urban form and layout can be intelligently adjusted for multi-scale urban blocks, and the feasibility of an adjustment plan can be determined.

The objective of the present invention may be achieved by the following technical solutions:

An AI-assisted method for providing an urban design form and layout with an improved wind environment includes the following steps:

step I: data acquisition, including:

acquiring data about a wind velocity and a wind direction of a fixed point in a city in an original urban design plan by using a 32-channel aerovane with a global position system (GPS), and acquiring, from a local planning department, three-dimensional vector data, urban design plan data, and urban design standard specification data of a city where a block is located;

step II: construction of a wind field interactive sand table, including:

inputting the data acquired in step I to a geographic information system platform, inputting a measured wind direction and a measured wind velocity to perform simulation to generate a nephogram and a vector diagram of a wind direction and wind velocity distribution, and superposing the nephogram and the vector diagram with a three-dimensional urban space digital model, to construct a wind field interactive sand table, setting wind direction and wind velocity parameters for simulation, constructing an urban wind field simulation environment, comparing data about a wind direction and a wind velocity of the fixed point in step I simulated in a wind field with the measured data, and adjusting parameter values of a wind velocity, a wind direction, a height of a calculation domain, and a size of an initial grid according to an error coefficient between the simulated data and the measured data, until the error coefficient is less than or equal to 3%;

step III: wind field simulation and evaluation of an urban design plan, including:

placing the urban design plan in the wind field interactive sand table, extracting the data about the wind velocity simulated in the wind field of the block in the design plan, grading wind environment impact according to the Beaufort Scale, if all wind grading results are in a wind scale range of 0-4, performing step VII, and if wind of a scale of 5 or more occurs in partial areas, performing step IV;

step IV: AI-assisted adjustment of an urban design form and layout, including:

extracting the areas in the urban design plan that have a simulated wind scale of 5 or more, rasterizing the areas, randomly moving geometric center points of bottom areas of buildings to cross points in grids by means of an AI algorithm by using the cross points in the grids as a reference, and rearranging the buildings; and determining whether a sum of the bottom areas of the buildings in the block after the rearrangement equals a sum of the bottom areas of the buildings in the block in the original plan, that is, whether a function M of a difference between the two sums equals 0, and if M does not equal 0, rearranging the buildings, until M equals 0, so as to ensure that the buildings after layout adjustment do not overlap and that the buildings are always within a border range of the block, where an equation of the function M is as follows:

$$M = SUM_{adjusted} - SUM_{original},$$ where $SUM_{adjusted}$ is the sum of the bottom areas of the buildings in the block after the rearrangement, and $SUM_{original}$ is the sum of the bottom areas of the buildings in the block in the original plan;

step V: determination of conformity to urban design standard specifications, including:

inputting the adjusted layout to the wind field interactive sand table, performing quantitative calculation of indexes in accordance with a local Urban Design Standards and Guidelines, and if a calculation result does not conform to the urban design standards and guidelines, repeating step IV, until all building layouts satisfy requirements in the local Urban Design Standards and Guidelines;

step VI: wind field simulation and evaluation of an adjusted plan, including:

placing the plan that has an adjusted layout and form and conforms to the local Urban Design Standards and Guidelines into the wind field interactive sand table, extracting data about a wind velocity simulated in the wind field of the block in the adjusted plan, evaluating a wind scale according to the Beaufort Scale, and if wind of a scale of 5 or more occurs, repeating step IV, until all wind scale simulation results are within a wind scale range of 0-4; and step VII: holographic display of the plan with an improved wind environment, including:

performing omnidirectional display of the urban design plan with an improved wind environment by using a 4D holographic projector, where the device includes a VR panoramic display stand carrying a wind environment simulation system, an adjustable axial flow fan, and 3D tracking glasses.

Further, the three-dimensional urban space digital model is generated after the three-dimensional urban vector data is adjusted to a China geodetic coordinate system 2000, and includes information such as urban geographic elevations, road networks, building outlines, building heights, urban water systems, and urban mountains.

Further, in step II, the parameter values of the wind velocity, the wind direction, the height of the calculation domain, and the size of the initial grid are adjusted, the wind velocity adjustment means that a computer calculates wind velocity errors $W_1, W_2, W_3 \ldots, W_n$ of all points by a wind velocity using error equation $$W = \frac{\text{Simulated wind velocity } V_1 - \text{Measured wind velocity } V_0}{\text{Measured wind velocity } V_0},$$

calculates an average error by using an equation $$W_{average} = \frac{W_1 + W_2 + W_3 + \ldots\ldots + W_n}{n},$$

and automatically corrects the wind velocity errors; the wind direction adjustment means that the computer calculates wind direction errors $F_1, F_2, F_3 \ldots, F_n$ of all points by using a wind direction error equation $$F = \frac{\text{Simulated wind direction } F_1 - \text{Measured wind direction } F_0}{\text{Measured wind direction } F_0},$$

calculates an average error by using an equation $$F_{average} = \frac{F_1 + F_2 + F_3 + \ldots\ldots + F_n}{n},$$

and automatically corrects the wind direction errors; and if partial areas fail to be simulated, the computer automatically adjusts the height of the calculation domain until an entire range is covered or reduces the initial grid, the computer reduces the initial grid by 10% each time until wind velocity and wind direction simulation of all measured points is achieved.

Further, the AI algorithm in step IV adopts a random algorithm, rearranging the buildings to adjust the urban form and layout means rasterizing the block, a size of each grid is 1 m*1 m, the grids are numbered as 1-n to create a set A, the geometric centers of bottom surfaces of the buildings are numbered as X1-XN to create a set B, the buildings are distributed on the block by using (a, b), where $a \in A$, and $b \in B$, items are randomly selected from the set A and the set B by using the random algorithm and are combined, to form a list [(a1, b1), (a2, b2) . . . , (an, bn)], where $an \in A$, and $bn \in B$, and a data set in the list is projected onto a space of the block to form an adjusted urban design form and layout.

Further, performing quantitative calculation of the indexes in accordance with the local Urban Design Standards and Guidelines in step V means translating urban design standard specification data into an urban design sand table index library and comparing the data with plan index data in the sand table, where the Urban Design Standards and Guidelines is an Urban Design Standards and Guidelines issued by the city, and if the city does not issue an Urban Design Standards and Guidelines, the Urban Design Standards and Guidelines of a province where the city is located is used.

Beneficial effects of the present invention are as follows:

1. According to the present invention, wind velocity simulation software is combined with the geographic information platform, to form a wind field interactive sand table. Thus, a large error caused by artificial adjustment of conventional wind environment simulation parameters is avoided, and the error is controlled within 3%. The complexity of collaborative operation of a plurality of pieces of conventional wind environment simulation software is reduced. The tedious wind environment operation is simplified. In step IV, the urban design layout is automatically optimized by using a combination of the random algorithm and a rasterized urban design plane. Application of the random algorithm to the field of adjustment of the urban form and layout breaks the judgment of experts for conventional urban design layout, providing more feasible plans and a more intelligent and automated process.
2. According to the present invention, the data about the wind velocity and the wind direction data, the three-dimensional urban vector data, the urban design plan data, and the urban design standard specification data are inputted to the geographic information system to construct the sand table, so that the computer performs wind environment simulation. By means of actual measurement and verification and feedback adjustment, exquisite simulation if realized for a wind environment in the design plan in a real urban scene, thereby maximizing the accuracy and the efficiency of wind environment simulation.
3. The present invention overcomes a limitation of a conventional method that aims at only individual buildings without considering surrounding building layouts, realizes the layout optimization of design plan and the improvement of the entire wind environment quality under all over the city, and the quality reduction of surrounding wind environments due to the adjustment of individual buildings is effectively avoided.
4. According to the present invention, the urban form and layout adjustment method based on the rasterized block and the random algorithm is combined with the evaluation of wind environment impact. By means of interactive feedback and gradual optimization, wind of a scale more than 4 is prevented in all areas of the urban design plan.

5. According to the present invention, quantitative calculation is performed in accordance with the local Urban Design Standards and Guidelines, so that the feasibility of the adjusted urban design plan is guaranteed.
6. According to the present invention, wind environment simulation is performed for the urban design plan, and the methods and the sand tables are automatically adjusted and screened. In this way, large manpower and material consumption, human judgment, large randomness, and the small scales in the conventional wind environment improvement are avoided, efficient, scientific, wholly automated, accurate, and intelligent adjustment of the urban design plan for different-scale improvement of an urban wind environment is realized, and references are provided for the adjustment of the urban design plan layout with an improved wind environment of urban design.
7. According to the present invention, by means of a 4D holographic projection platform, the wind environment is visually and receptively displayed, enhancing the display effect.

BRIEF DESCRIPTION OF THE DRAWINGS

The following further describes the present invention in detail with reference to the accompanying drawings.

FIG. 2 is the Beaufort Scale.

DETAILED DESCRIPTION

The technical solutions of the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the description of the present invention, it should be understood that orientation or position relationships indicated by the terms such as “hole”, “above”, “below”, “thickness”, “top”, “middle”, “length”, “inside”, and “around” are used only for ease and brevity of illustration and description, rather than indicating or implying that the mentioned component or element need to have a particular orientation or need to be constructed and operated in a particular orientation. Therefore, such terms should not be construed as a limitation to the present invention.

Figure 1:
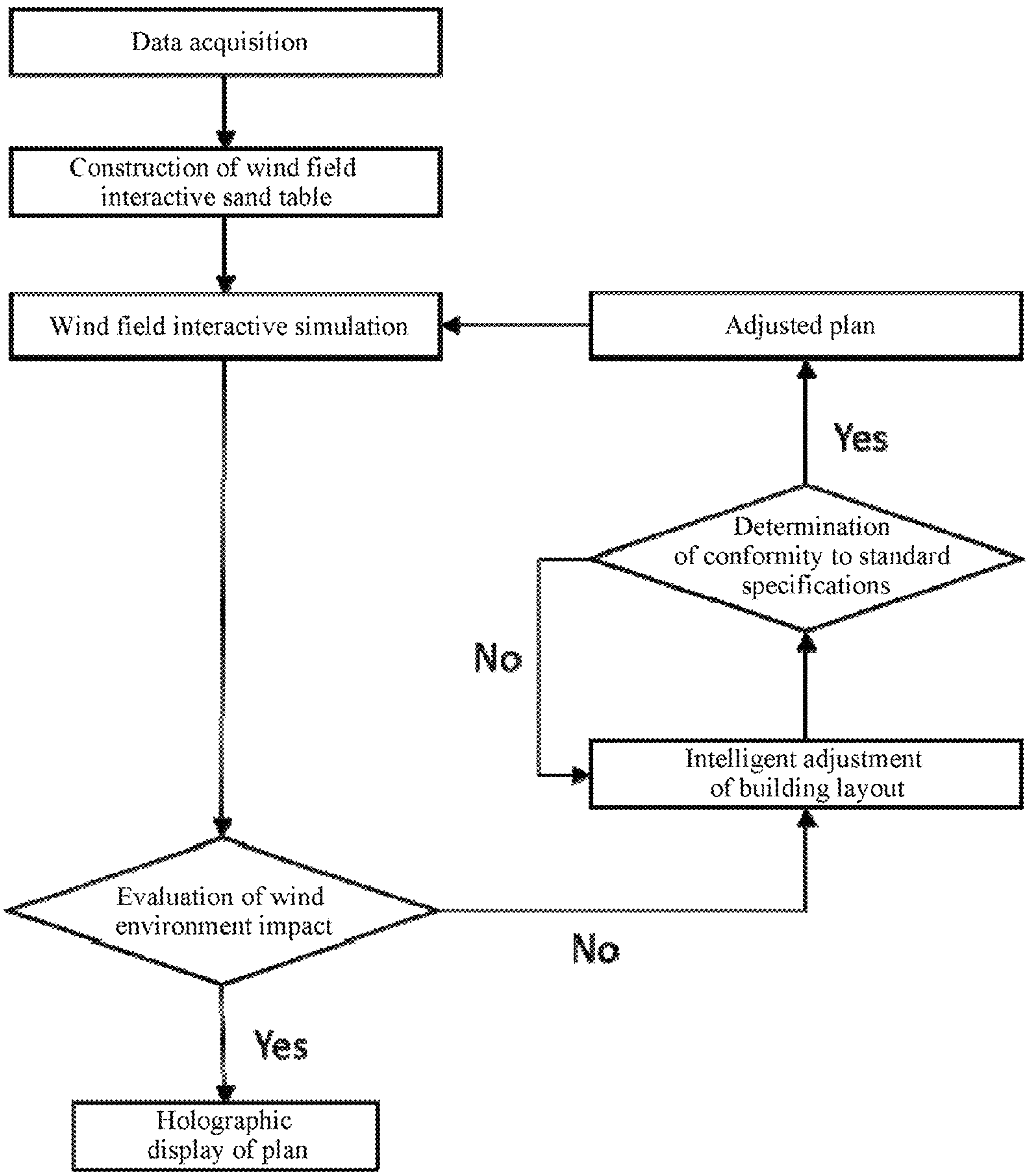
FIG. 1 is a flowchart of a method according to the present invention.
Figure 3:
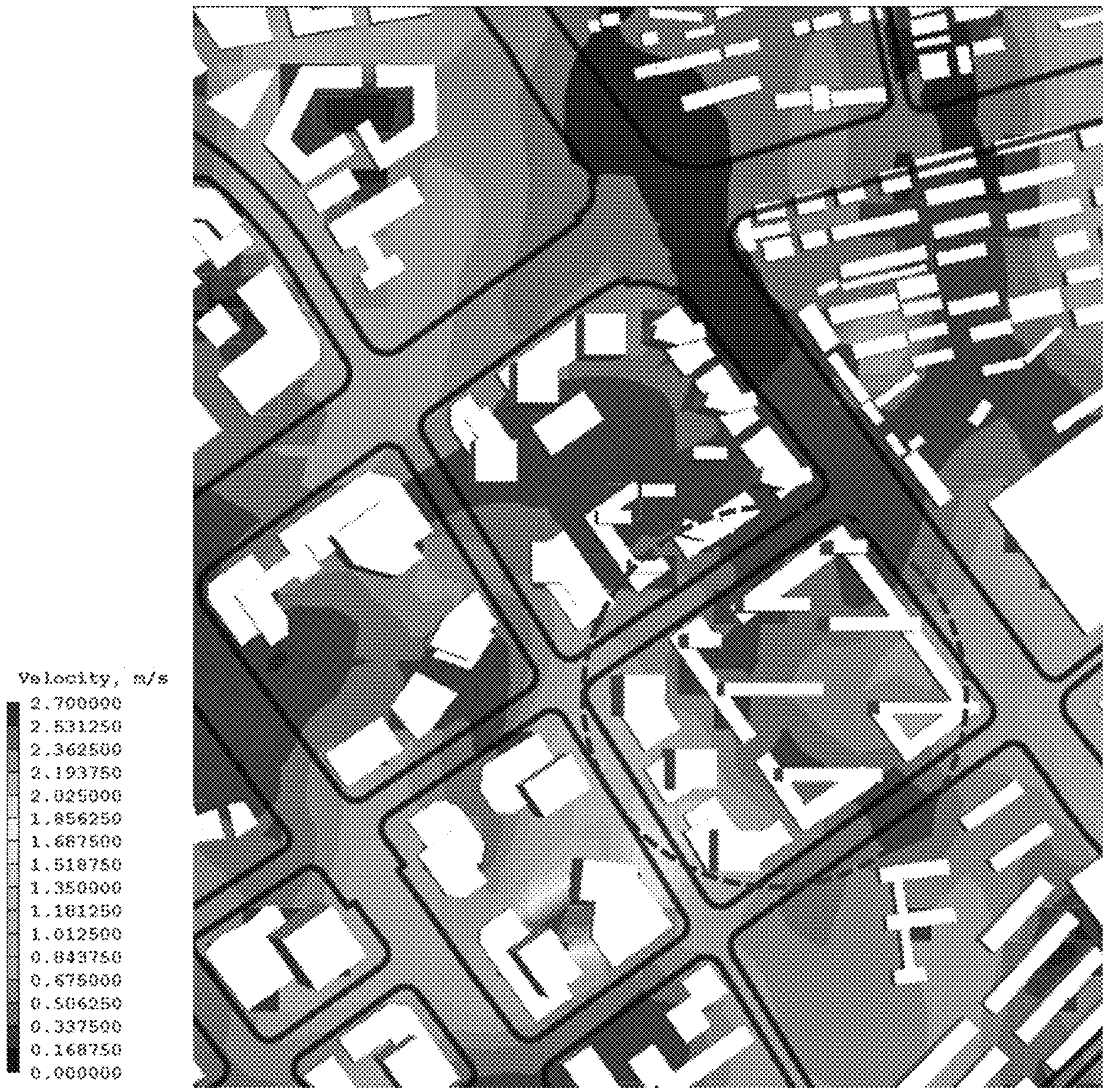
FIG. 3 illustrates an effect of a wind environment in a local area in an original plan.
Figure 4:
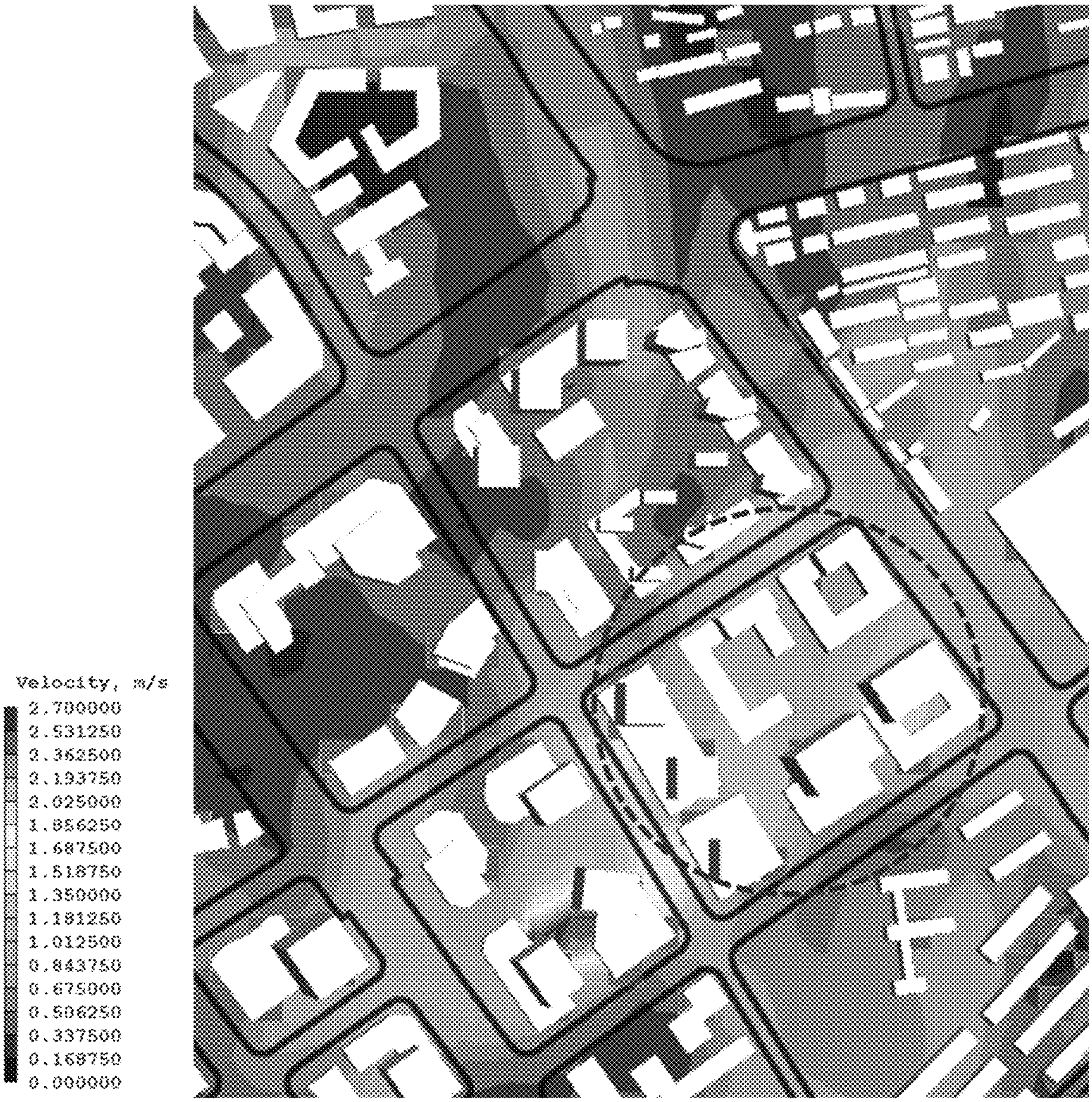
FIG. 4 illustrates an effect of a wind environment in a local area in a plan with an adjusted layout and form.

An AI-assisted method for providing an urban design form and layout with an improved wind environment includes the following steps, as shown in FIG. 1 to FIG. 4.

I: Data acquisition. Data about a wind velocity and a wind direction of a fixed point in a city in an original urban design plan is randomly acquired by using a 32-channel aerovane with a global position system (GPS), and three-dimensional vector data, urban design plan data, and urban design standard specification data of a city where a block is located are acquired from a local planning department.

The 32-channel aerovane with a GPS is configured to record a wind velocity and a wind direction having specific position coordinates.

The randomly acquiring the data about the wind velocity and the wind direction of the fixed point in the city in the original urban design plan means continuously performing measurement at a time at which gale in a predominant wind direction or an adverse wind direction frequently occurs and that is selected according to meteorological statistics. During the measurement, a wind direction, an instantaneous maximum wind velocity, and an average wind velocity are recorded every 3-5 minutes. Areas are randomly selected, but are required to include a predominant wind direction area, a main activity area, a most adverse area, an area having a special requirement such as a pollutant discharging area or a heat source discharging area, and a ventilation opening. A measurement height is 1.5 m from the ground or an activity platform.

The three-dimensional vector data includes all vector blocks and vector building blocks in the city.

Data about the vector block and the vector building block are all polygonal data having closed outlines. The vector block data includes road network data (road outlines or road boundary lines), elevation data (used for simulating landforms), and water data. The vector building block data is required to include building height information (when a building height is unknown, the height is calculated according to a quantity of building storeys, and the building height=the building storey*3 m). The above data may be in a DWG format or an SHP format, and include geographic coordinate data.

II: Construction of a wind field interactive sand table. The data acquired in step I is inputted to a geographic information system platform to construct a sand table. A used computer device is required to be configured with eight Tesla V100 GPUs. Wind direction and wind velocity parameters for simulation are set, an urban wind field simulation environment is constructed, data about a wind direction and a wind velocity of the fixed point in step I simulated in a wind field are compared with the measured data, and the simulation parameters are adjusted, until an error coefficient is less than or equal to 3%.

Inputting the data acquired in step I to the geographic information system platform to construct a sand table means establishing a data file, establishing a connection to the file by using a data addition function of the geographic information platform, to ensure that formats of data about the vector blocks and vector plots are DWG or SHP, converting coordinates of the data by means of projection, including switching between projection coordinates, between geographic coordinates, and between different coordinate systems, adjusting the three-dimensional urban vector data to a China geodetic coordinate system 2000, stretching buildings by using Layer3DToFeatureClass and the building height information, to form a three-dimensional model, and generating a three-dimensional landform by using the elevation data and the water data, thereby generating a three-dimensional urban space digital model.

Constructing an urban wind field simulation environment means inserting CFD wind environment simulation software into the geographic information system platform as a plug-in, inputting a measured wind direction and a measured wind velocity to perform simulation to generate a nephogram and a vector diagram of a wind direction and wind velocity distribution, and superposing the nephogram and the vector diagram with the three-dimensional vector data, to construct a wind field interactive sand table.

Comparing the data about the wind direction and the wind velocity of the fixed point in step I simulated in the wind field with the measured data means inputting the randomly measured data about the wind direction and the wind velocity to a wind environment simulation module in the geographic information system, setting the wind direction and wind velocity parameters for simulation, performing wind environment simulation in the wind field interactive sand table, generating a wind direction and wind velocity attribute table, performing error calculation by using the measured data about the wind direction and the wind velocity, and adjusting parameter values of a wind velocity, a wind direction, a height of a calculation domain, and a size of an initial grid according to an error coefficient between the simulated data and the measured data, until the error coefficient is less than or equal to 3%. The operations are intended to improve the accuracy and the precision of wind environment simulation in the sand table.

The wind velocity adjustment means that a computer calculates wind velocity errors $W_1, W_2, W_3 \ldots, W_n$ of all points by using a wind direction error equation $$W = \frac{\text{Simulated wind velocity } V_1 - \text{Measured wind velocity } V_0}{\text{Measured wind velocity } V_0},$$

calculates an average error by using an equation $$W_{average} = \frac{W_1 + W_2 + W_3 + \ldots\ldots + W_n}{n},$$

and automatically corrects the wind velocity errors. The wind direction adjustment means that the computer calculates wind direction errors $F_1, F_2, F_3 \ldots, F_n$ of all points by using a wind direction error equation $$F = \frac{\text{Simulated wind direction } F_1 - \text{Measured wind direction } F_0}{\text{Measured wind direction } F_0},$$

calculates an average error by using an equation $$F_{average} = \frac{F_1 + F_2 + F_3 + \ldots\ldots + F_n}{n},$$

and automatically corrects the wind direction errors. If partial areas fail to be simulated, the computer automatically adjusts the height of the calculation domain until an entire range is covered or reduces the initial grid, the computer reduces the initial grid by 10% each time until wind velocity and wind direction simulation of all measured points is achieved.

III: Wind field simulation and evaluation of an urban design plan. The urban design plan is placed in the wind field interactive sand table, the data about the wind velocity simulated in the wind field of the block in the design plan is extracted, wind environment impact is evaluated according to the Beaufort Scale, if all wind evaluation results are in a wind scale range of 0-4, step VII is performed, and if partial areas have an evaluation result of more than the wind scale range of 0-4, step IV is performed.

Placing the urban design plan in the wind field interactive sand table means establishing a connection to the data about the vector blocks and the vector building blocks of the design plan by using the data addition function of the geographic information platform, converting coordinates of the data by means of projection, including switching between projection coordinates, between geographic coordinates, and between different coordinate systems, adjusting the three-dimensional urban vector data to the China geodetic coordinate system 2000. Buildings are stretched by using Layer3DToFeatureClass and the building height information, to form a three-dimensional model, and a three-dimensional landform is generated by using the elevation data and the water data, to form a three-dimensional model of the urban design plan.

Extracting the data about the wind velocity simulated in the wind field of the block in the design plan means obtaining a wind velocity and a wind direction of each geographic coordinate after the wind environment simulation, and generating a wind direction and wind velocity attribute table having position information and a nephogram and a vector diagram of a wind direction and wind velocity distribution.

Grading wind environment impact according to the Beaufort Scale means translating the Beaufort Scale into a wind velocity comfort attribute table, inputting the wind velocity comfort attribute table to the wind field interactive sand table, and associating the Beaufort Scale with the wind direction and wind velocity attribute table for automatic judgment, if all evaluation results are in the wind scale range of 0-4, which means a wind environment comfort standard is satisfied, performing step VII, if evaluation results of partial areas exceed the wind scale range of 0-4, which indicates that the wind environment comfort standard is not satisfied, recognizing, by the geographic information system, coordinates of the areas and marking the areas in the three-dimensional sand table, and performing step IV.

IV: AI-assisted adjustment of an urban design form and layout. For areas in the urban design plan form and layout that do not conform to the Beaufort Scale, the block is rasterized, and the buildings are randomly rearranged based on the random algorithm, to adjust the urban form and layout. In addition, it is ensured that the buildings do not overlap, and do not exceed a boundary of the block.

Rasterizing the blocks means dividing the blocks into grids of a size within 1 m*1 m by using a polygon to raster command, to improve the adjustment precision of the plan.

Randomly rearranging the buildings based on the random algorithm to adjust the urban form and layout means numbering grid vertices as 1-n to create a set A, numbering geometric centers of bottom surfaces of the buildings as X1-XN to create a set B, where the buildings are randomly distributed on the block by using (a, b), $a \in A$, and $b \in B$, selecting items from the set A and the set B by using the random algorithm and combining the items, to form a list [(a1, b1), (a2, b2) . . . , (an, bn)], where $an \in A$, and $bn \in B$, and projecting a data set in the list onto a space of the block to form an adjusted urban design form and layout.

For the geometric centers of the buildings, a polygonal block surface is converted to a center point of each surface in the geographic information platform by using a feature to point command. The center points include coordinate data.

Ensuring that buildings do not overlap and do not exceed the boundary of the block means determining whether a sum of building layout grids in the block of the adjusted plan equals a sum of building layout grids in the block of the original plan, that is, a function of a difference between the two sums is 0. Processing is performed according to the following equation:

$M=SUM_{adjusted}-SUM_{original}$, where $SUM_{adjusted}$ is the sum of the building layout grids in the block of the adjusted plan. and $SUM_{original}$ is the sum of the building layout grids in the block of the original plan.

The sum of the building layout grids in the block of the original plan is obtained by means of an SUM operation after a building data attribute table is generated.

The sum of the building layout grids in the block of the adjusted plan is obtained as follows. All building grid data is first processed by using a union of inputs command to obtain all new building grid data, then block grid data and new buildings are processed by using an intersect command to obtain building grids in the block, to generate the building data attribute table, and a SUM operation is performed to obtain the sum of the building grids.

V: Determination of conformity to urban design standard specifications. The adjusted layout is inputted to the wind field interactive sand table, quantitative calculation of indexes is performed in accordance with a local Urban Design Standards and Guidelines, and if forms and layouts of partial areas do not conform to the urban design standards and guidelines, step IV is repeated, until all forms and layouts satisfy requirements in the local Urban Design Standards and Guidelines.

Performing quantitative calculation of the indexes in accordance with the local Urban Design Standards and Guidelines means translating building spacing and building setback line standard specifications into an urban design sand table index library, generating, in the geographic information system, a building spacing and building setback line attribute table of the adjusted plan, associating the table with the index library, and automatically determining, by the sand table, whether the requirements are satisfied. The Urban Design Standards and Guidelines is an Urban Design Standards and Guidelines issued by the city. If the city does not issue an Urban Design Standards and Guidelines, the Urban Design Standards and Guidelines of a province where the city is located is used.

VI: Wind field simulation and evaluation of an adjusted plan. The plan that has an adjusted layout and form and conforms to the local Urban Design Standards and Guidelines is placed into the wind field interactive sand table, data about a wind velocity simulated in the wind field of the block in the adjusted plan is extracted, a wind scale is evaluated according to the Beaufort Scale, and if partial areas have an evaluation result of more than the wind scale range of 0-4, step IV is repeated, until the evaluation result is in the wind scale range of 0-4. A specific operation is same as that in step III.

VII: Holographic display of the plan with an improved wind environment. Omnidirectional display of the urban design plan with an improved wind environment is performed by using a 4D holographic projector. The device includes a VR panoramic display stand carrying a wind environment simulation system, an adjustable axial flow fan, and 3D tracking glasses.

The VR panoramic display stand carrying the wind environment simulation system and the 3D tracking glasses are configured to display the three-dimensional urban space model having the nephogram and the vector diagram of the wind direction and wind velocity distribution. The adjustable axial flow fan is configured to simulate the real feeling to wind. The above jointly forms a holographic display module for a visualized and perceivable plan with an improved wind environment.

Embodiments

The technical solution of the present invention is described in detail below by using urban design of an area in Changzhou as an example.

(1) The area in Changzhou is used as a target block. Three-dimensional vector data, urban design plan data, and urban design standard specification data of Changzhou are acquired. Randomly acquiring data about a wind direction and a wind velocity of a fixed point in Changzhou specifically includes the following.

(1.1) The three-dimensional vector data, the urban design plan data, and the urban design standard specification data of Changzhou are obtained from the planning department of Changzhou. The above data includes current closed block CAD/SHP files of Changzhou, closed block CAD/SHP files in a design plan, current closed land plot CAD/SHP files, current closed building and storey (height) CAD/SHP files, elevation data, water data, and data about a building spacing and a building setback line in the urban design standard specifications.

(1.2) A time at which gale in a predominant wind direction or an adverse wind direction frequently occurs is selected according to meteorological statistics. At a measurement height of 1.5 m from the ground or an activity platform, a 32-channel aerovane with a GPS is used to record a wind velocity and a wind direction having specific position coordinates. The measurement is continuously performed, and a wind direction, an instantaneous maximum wind velocity, and an average wind velocity are recorded every 3-5 minutes. 200 areas are randomly selected, but are required to include a predominant wind direction area, a main activity area, a most adverse area, an area having a special requirement such as a pollutant discharging area or a heat source discharging area, and a ventilation opening.

(2) The above data is inputted to geographic information system software to construct a sand table. Details are as follows.

(2.1) The current closed block CAD files, the current closed land plot CAD files, the elevation data files, and the water data files in the current three-dimensional vector data of Changzhou are imported into the geographic information system software, and an SHP format of a closed polyline is exported. The current closed building and storey (height) CAD files are imported into the geographic information system software, and an SHP format of a building polyline and an SHP format of a storey point are exported. Spatial correlation is performed on the building closed surface of the building storey point, and information about a quantity of storeys (heights) is attached to each building.

(2.2) Coordinates of the data are converted by means of projection, including switching between projection coordinates, between geographic coordinates, and between different coordinate systems, and the three-dimensional urban vector data is adjusted to the China geodetic coordinate system 2000.

(2.3) Buildings are stretched by using Layer3DToFeatureClass and the building height information, to form a three-dimensional model, and a three-dimensional landform is formed by using the elevation data and the water data, thereby generating a three-dimensional urban space digital model.

(2.4) CFD wind environment simulation software is inserted into the geographic information system platform as a plug-in, a measured wind direction and a measured wind velocity are inputted to perform simulation to generate a nephogram and a vector diagram of a wind direction and wind velocity distribution, and the nephogram and the vector diagram are superposed with the three-dimensional urban vector data, to construct a wind field interactive sand table.

(2.5) The randomly measured data about the wind direction and the wind velocity of the 200 fixed points is inputted to a wind environment simulation module in the geographic information system, the wind direction and wind velocity parameters are set for simulation, wind environment simulation is performed in the wind field interactive sand table, a wind direction and wind velocity attribute table is generated, and error calculation is performed by using the measured data about the wind direction and the wind velocity, where an error coefficient is 6.8%. Parameter values of a wind velocity, a wind direction, a height of a calculation domain, and a size of an initial grid are adjusted according to an error coefficient between the simulated data and the measured data. A final error is 2.6%, which is less than or equal to 3%. Therefore, an accurate wind field interactive sand table is obtained.

(3) An urban design plan is placed in the wind field interactive sand table to perform wind field simulation and evaluation of the urban design plan. Details are as follows.

(3.1) The closed block CAD files, closed land plot CAD files, the building and storey (height) CAD files, elevation data files, and water data files of the design plan are imported into the previously constructed wind field interactive sand table, and an SHP format of a closed polyline, an SHP format of a building polygon, and an SHP format of a storey point are exported. Spatial correlation is performed on the building closed surface of the building storey point, and information about a quantity of storeys (heights) is attached to each building.

(3.2) Coordinates of the data are converted by means of projection, including switching between projection coordinates, between geographic coordinates, and between different coordinate systems, and the three-dimensional urban vector data of the urban design plan is adjusted to the China geodetic coordinate system 2000.

(3.3) Buildings are stretched by using Layer3DToFeatureClass and the building height information, to form a three-dimensional model, and a three-dimensional landform is generated by using the elevation data and the water data, to form a three-dimensional model of the urban design plan.

(3.4) Wind environment simulation is performed by using the wind environment simulation module in the wind field interactive sand table, to obtain the wind direction and wind velocity attribute table having geographic position information and the overall nephogram and vector diagram of a wind direction and wind velocity distribution.

(3.5) The wind velocity comfort attribute table is translated into a wind velocity comfort attribute table, is inputted to the wind field interactive sand table, and is associated with the wind direction and wind velocity attribute table for automatic judgment. Evaluation criteria are as follows. If all evaluation results are in a wind scale range of 0-4, a wind environment comfort standard is satisfied. If evaluation results of partial areas exceed the wind scale range of 0-4, which indicates that the wind environment comfort standard is not satisfied, the geographic information system automatically recognizes coordinates of the areas and marks the areas in the three-dimensional sand table.

(4) For areas in the urban design form and layout plan that do not conform to the Beaufort Scale, AI-assisted adjustment is performed. Details are as follows.

(4.1) A block is rasterized, and is divided into 13580 grids each having a dimension of 1 m*1 m, and grid vertices are numbered from 1 in sequence to create a set A. A polygonal block surface is converted to a center point of each surface by using a feature to point command. The center points include coordinate data. The center point includes coordinate data. Geometric centers of bottom surfaces of buildings are numbered as X1-XN to create a set B. The buildings are randomly distributed on the block by using (a, b), a∈A, and b∈B. Items are randomly selected from the set A and the set B by using the random algorithm and are combined, to form a list [(a1, b1), (a2, b2) . . . , (an, bn)], where an∈A, and bn∈B, and a data set in the list is projected onto a space of the block to form an adjusted urban design form and layout.

(4.2) In the adjusted urban form and layout, the buildings are required to avoid overlapping, and cannot exceed a boundary of the block. It is determined whether a sum of building layout grids in the block of the adjusted plan equals a sum of building layout grids in the block of the original plan. A function of a difference between the two sums is established. An equation is as follows.

$$M=SUM_{adjusted}-SUM_{original},\text{ where}$$

$SUM_{adjusted}$ is the sum of the building layout grids in the block of the adjusted plan. and $SUM_{original}$ is the sum of the building layout grids in the block of the original plan.

(4.3) In the original plan, a building data attribute table is generated, and the sum 9765 of the building layout grids is obtained by means of SUM operation. In the adjusted plan, all building grid data is first processed by using a union of inputs command to obtain all new building grid data, then block grid data and new buildings are processed by using an intersect command to obtain building grids in the block, to generate the building data attribute table, and a SUM operation is performed to obtain the sum 8653 of the building grids. The two sums are substituted into the equation. The obtained difference is not 0. Thus, the above operations are repeated, until M=0, thereby generating a finally adjusted urban design form and layout.

(5) The finally adjusted urban design plan is inputted to the wind field interactive sand table again, and conformity to the urban design standard specifications is determined. Details are as follows.

(5.1) The specifications such as building sunshine spacings, building gable spacings, standards for building setback from road boundary lines, standards for building setback from railway boundary lines, and standards for building setback from rivers in the Changzhou implementing regulations (that is, local urban design standards and guidelines of Changzhou) of the Jiangsu Province Urban Planning Management Technology Stipulation are translated into an urban design sand table index library, building spacing and building setback attribute tables are generated in the adjusted plan in the geographic information system, and are associated with the index library for quantitative calculation. The sand table automatically determines whether the requirements are satisfied. The residential building sunshine spacings are required to be $$\frac{\text{Building spacing } L}{\text{Building Height } D} \geq 1.25.$$

Non-residential building sunshine spacings between low-rise buildings are required to be at least 6 m, non-residential building sunshine spacings between multi-storey buildings are required to be at least 10 m, and non-residential building sunshine spacings between high-rise buildings are required to be at least 13 m. Requirements for a gable spacing are shown in Table 1.

TABLE 1

| Minimum spacing between building gables | | | | | | | | |
|---|---|---|---|---|---|---|---|---|
| Building height Spacing | | High-rise building | | | | Small high-rise | Multi-storey | Low-rise |
| Building height (m) | | ≥100 | ≥80, <100 | ≥50, <80 | <50 | building | building | building |
| High-rise building | ≥100 | 30 | | | | | | |
| | ≥80, <100 | 30 | 20 | | | | | |
| | ≥50, <80 | 25 | 20 | 18 | | | | |
| | <50 | 20 | 20 | 18 | 15 | | | |
| Small high-rise building | | 15 | 15 | 15 | 15 | 13 | | |
| Multi-storey building | | 13 | 13 | 13 | 13 | 9 | 8 | |
| Low-rise building | | 13 | 13 | 13 | 13 | 9 | 6 | 6 |

Requirements for building setback from road boundary lines are shown in Table 2. Building setback from trunk railways is required to be not less than 20 m, and building setback from branch railways is required to be not less than 15 m. Building setback from rivers with revetments is required to be not less than 5 m, and building setback from rivers without revetments is required to be not less than 10 m. Results show that partial areas fail to satisfy the related standard specifications. 38 areas fail to satisfy the building spacing requirements, and 42 areas fail to satisfy the building setback requirements. Therefore, the urban form and layout is readjusted, until all forms and layouts satisfy the requirements of the local implementing regulations of Changzhou in the Jiangsu Province Urban Planning Management Technology Stipulation.

TABLE 2

| Minimum building setback distance from urban planning road boundary line | | | | |
|---|---|---|---|---|
| Building height Setback distance Road width (m) | | Less than 24 m | 24-50 m | Greater than 50 m |
| 40 m and above | Express way | 20 | 20 | 20 |
| | Transportation trunk road | 15 | 15 | 20 |
| | Life trunk road | 10 | 15 | 20 |
| 30 m and above to 40 m | | 8 | 15 | 20 |
| 20 m and above to 30 m | | 8 | 10 | 15 |
| Below 20 m | | 5 | 8 | 15 |

(6) A plan having an adjusted layout and form and conforming to the implementing regulations of Changzhou in the Jiangsu Province Urban Planning Management Technology Stipulation is placed in the wind field interactive sand table, to perform wind field simulation and evaluation of the adjusted plan. Evaluation results are obtained according to the steps in (3). All areas satisfy the wind scale of 0-4.

(7) Omnidirectional display of the urban design plan with an improved wind environment is performed by using a 4D holographic projector. The device includes a VR panoramic display stand carrying a wind environment simulation system, an adjustable axial flow fan, and 3D tracking glasses.

The VR panoramic display stand carrying the wind environment simulation system and the 3D tracking glasses are configured to display the three-dimensional urban space model having the nephogram and the vector diagram of the wind direction and wind velocity distribution. The adjustable axial flow fan is configured to simulate the real feeling to wind.

In the descriptions of this specification, a description of a reference term such as "an embodiment", "an example", or "a specific example" means that a specific feature, structure, material, or characteristic that is described with reference to the embodiment or the example is included in at least one embodiment or example of the present invention. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing displays and describes basic principles, main features, and advantages of the present invention. A person skilled in the art may understand that the present invention is not limited to the foregoing embodiments. Descriptions in the embodiments and this specification only illustrate the principles of the present invention. Various modifications and improvements are made in the present invention without departing from the spirit and the scope of the present invention, and such modifications and improvements shall fall within the protection scope of the present invention.

What is claimed is:

1. An artificial-intelligence (AI)-assisted method for providing an urban design form and layout with an improved wind environment, the AI-assisted method comprising the following steps:

step I: data acquisition, comprising:

acquiring data about a wind velocity and a wind direction of a fixed point in a city in an original urban design plan by using a 32-channel aerovane with a global position system (GPS), and acquiring, from a local planning department, three-dimensional vector data, urban design plan data, and urban design standard specification data of a city where a block is located;

step II: construction of a wind field interactive sand table, comprising:

inputting the data acquired in step I to a geographic information system platform, inputting a measured wind direction and a measured wind velocity to perform simulation to generate a nephogram and a vector diagram of a wind direction and wind velocity distribution, and superposing the nephogram and the vector diagram with a three-dimensional urban space digital model, to construct the wind field interactive sand table, setting wind direction and wind velocity parameters for simulation, constructing an urban wind field simulation environment, comparing the data about the wind direction and the wind velocity of the fixed point in step I simulated in a wind field with the measured data, and adjusting parameter values of the wind velocity, the wind direction, a height of a calculation domain, and a size of an initial grid according to an error coefficient between the simulated data and the measured data, until the error coefficient is less than or equal to 3%;

step III: wind field simulation and evaluation of an urban design plan, comprising:

placing the urban design plan in the wind field interactive sand table, extracting the data about the wind velocity simulated in the wind field of the block in the urban design plan, grading wind environment impact according to Beaufort Scale, if all wind grading results are in a wind scale range of 0-4, performing step VII, and if wind of a scale of 5 or more occurs in partial areas, performing step IV;

step IV: AI-assisted adjustment of the urban design form and layout, comprising:

extracting the areas in the urban design plan that have a simulated wind scale of 5 or more, rasterizing the areas, randomly moving geometric center points of bottom areas of buildings to cross points in grids by means of an AI algorithm by using the cross points in the grids as a reference, and rearranging the buildings; and determining whether a sum of the bottom areas of the buildings in the block after the rearrangement equals a sum of the bottom areas of the buildings in the block in the original plan, that is, whether a function M of a difference between the two sums equals 0, and if M does not equal 0, rearranging the buildings, until M equals 0, so as to ensure that the buildings after layout adjustment do not overlap and that the buildings are always within a border range of the block, wherein an equation of the function M is as follows:

$$M = SUM_{adjusted} - SUM_{original}, \text{ wherein}$$

$SUM_{adjusted}$ is the sum of the bottom areas of the buildings in the block after the rearrangement, and $SUM_{original}$ is the sum of the bottom areas of the buildings in the block in the original plan;

step V: determination of conformity to urban design standard specifications, comprising:

inputting the adjusted layout to the wind field interactive sand table, performing quantitative calculation of indexes in accordance with a local Urban Design Standards and Guidelines, and if a calculation result does not conform to the local urban design standards and guidelines, repeating step IV, until all building layouts satisfy requirements in the local Urban Design Standards and Guidelines;

step VI: wind field simulation and evaluation of an adjusted plan, comprising:

placing the adjusted plan that conforms to the local Urban Design Standards and Guidelines into the wind field interactive sand table, extracting data about a wind velocity simulated in the wind field of the block in the adjusted plan, evaluating a wind scale according to Beaufort Scale, and if wind of a scale of 5 or more occurs, repeating step IV, until all wind scale simulation results are within a wind scale range of 0-4; and step VII: holographic display of a plan with an improved wind environment, comprising:

performing omnidirectional display of the urban design plan with an improved wind environment by using a 4D holographic projector, wherein the 4D holographic projector comprises a VR panoramic display stand carrying a wind environment simulation system, an adjustable axial flow fan, and 3D tracking glasses.

2. The AI-assisted method for providing the urban design form and layout with the improved wind environment according to claim 1, wherein the three-dimensional urban space digital model is generated after the three-dimensional vector data is adjusted to a China geodetic coordinate system 2000, and comprises information such as urban geographic elevations, road networks, building outlines, building heights, urban water systems, and urban mountains.

3. The AI-assisted method for providing the urban design form and layout with the improved wind environment according to claim 1, wherein in step II, the parameter values of the wind velocity, the wind direction, the height of the calculation domain, and the size of the initial grid are adjusted, the wind velocity adjustment means that a computer calculates wind velocity errors $W_1, W_2, W_3 \ldots, W_n$ of all points by using a wind velocity error equation $$W = \frac{\text{Simulated wind velocity } V_1 - \text{Measured wind velocity } V_0}{\text{Measured wind velocity } V_0},$$

calculates an average error by using an equation $$W_{average} = \frac{W_1 + W_2 + W_3 + \ldots\ldots + W_n}{n},$$

and automatically corrects the wind velocity errors; the wind direction adjustment means that the computer calculates wind direction errors $F_1, F_2, F_3 \ldots, F_n$ of all points by using a wind direction error equation $$F = \frac{\text{Simulated wind direction } F_1 - \text{Measured wind direction } F_0}{\text{Measured wind direction } F_0},$$

calculates an average error by using an equation $$F_{average} = \frac{F_1 + F_2 + F_3 + \ldots\ldots + F_n}{n},$$

and automatically corrects the wind direction errors; and if partial areas fail to be simulated, the computer automatically adjusts the height of the calculation domain until an entire range is covered or reduces the initial grid, the computer reduces the initial grid by 10% each time until wind velocity and wind direction simulation of all measured points is achieved.

4. The AI-assisted method for providing the urban design form and layout with the improved wind environment according to claim 1, wherein the AI algorithm in step IV adopts a random algorithm, rearranging the buildings to adjust the urban design form and layout means rasterizing the block, a size of each grid is 1 m*1 m, the grids are numbered as 1-n to create a set A, the geometric center points of bottom areas of the buildings are numbered as X1-XN to create a set B, the buildings are distributed on the block by using (a, b), wherein a∈A, and b∈B, items are randomly selected from the set A and the set B by using the random algorithm and are combined, to form a list [(a1, b1), (a2, b2) . . . , (an, bn)], wherein an∈A, and bn∈B, and a data set in the list is projected onto a space of the block to form an adjusted urban design form and layout.

5. The AI-assisted method for providing the urban design form and layout with the improved wind environment according to claim 1, wherein performing quantitative calculation of the indexes in accordance with the local Urban Design Standards and Guidelines in step V means translating urban design standard specification data into an urban design sand table index library and comparing the urban design standard specification data with plan index data in the wind field interactive sand table, wherein the local Urban Design Standards and Guidelines is an Urban Design Standards and Guidelines issued by the city, and if the city does not issue an Urban Design Standards and Guidelines, the Urban Design Standards and Guidelines of a province where the city is located is used.

* * * * *